US012005557B2

(12) United States Patent
Thorson et al.

(10) Patent No.: US 12,005,557 B2
(45) Date of Patent: Jun. 11, 2024

(54) CHISEL HAMMER

(71) Applicant: MILWAUKEE ELECTRIC TOOL CORPORATION, Brookfield, WI (US)

(72) Inventors: Troy C. Thorson, Cedarburg, WI (US); Beth E. Cholst, Wauwatosa, WI (US); Matthew C. Cassabaum, Menomonee Falls, WI (US); Taylor Crabb, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/749,703

(22) Filed: May 20, 2022

(65) Prior Publication Data

US 2022/0371172 A1 Nov. 24, 2022

Related U.S. Application Data

(60) Provisional application No. 63/191,570, filed on May 21, 2021.

(51) Int. Cl.
*B25D 17/06* (2006.01)
*B25D 11/04* (2006.01)

(52) U.S. Cl.
CPC .............. *B25D 17/06* (2013.01); *B25D 11/04* (2013.01)

(58) Field of Classification Search
CPC ...... B25D 11/04; B25D 17/06; B25D 17/088; B25D 2217/0015; B25D 2217/0042; B25D 2250/191
See application file for complete search history.

(56) References Cited

U.S. PATENT DOCUMENTS 4,878,679 A * 11/1989 Plank .................. B25D 17/088 408/9
5,099,926 A * 3/1992 Fushiya ............... B25D 11/005 173/17

(Continued)

FOREIGN PATENT DOCUMENTS

GB 2192824 A * 1/1988 ........... B25D 11/005
JP 2019198645 A 11/2019

(Continued)

OTHER PUBLICATIONS

International Search Report and Written Opinion for Application No. PCT/US2022/030268 dated Sep. 8, 2022 (13 pages).

*Primary Examiner* — Thanh K Truong
*Assistant Examiner* — David G Shutty
(74) *Attorney, Agent, or Firm* — Michael Best & Friedrich LLP

(57) ABSTRACT

The present disclosure is directed to a power tool adapted to impart axial impacts to a tool bit. The power tool includes a housing, an electric motor, and a barrel. The power tool also includes a reciprocation drive assembly coupled to the electric motor and configured to convert torque from the electric motor to reciprocating motion of a piston that is received within the barrel for reciprocation therein. The power tool further includes a striker received within the barrel for reciprocation in response to reciprocation of the piston, and an anvil received within the barrel between the striker and the tool bit. The anvil is configured to communicate axial impacts to the tool bit in response to reciprocation of the striker. The anvil defines an opening and an inner bore that communicates with the opening, and the inner bore at least partially receives a shank of the tool bit.

9 Claims, 11 Drawing Sheets

(56) References Cited

U.S. PATENT DOCUMENTS

| | | | | | |
|---|---|---|---|---|---|
| 5,346,023 | A * | 9/1994 | Takagi | B25D 16/003 192/114 R |
| 5,373,905 | A * | 12/1994 | Bleicher | B25D 16/00 173/109 |
| 5,603,516 | A * | 2/1997 | Neumaier | B23Q 3/12 279/19.5 |
| 5,775,441 | A * | 7/1998 | Sakuragi | B25D 17/245 173/122 |
| 5,871,059 | A * | 2/1999 | Shibata | B25D 11/125 173/133 |
| 6,073,705 | A * | 6/2000 | Shibata | B25D 17/088 279/19.5 |
| 6,131,671 | A * | 10/2000 | Shibata | B25D 17/088 173/104 |
| 6,241,026 | B1 * | 6/2001 | Wache | B23Q 3/12 173/132 |
| 6,820,700 | B2 * | 11/2004 | Funfer | B25D 11/005 173/132 |
| 6,923,271 | B2 * | 8/2005 | Frauhammer | B25D 17/06 173/132 |
| 6,938,705 | B2 * | 9/2005 | Kikuchi | B25D 11/005 173/210 |
| 6,976,545 | B2 * | 12/2005 | Greitmann | B25D 16/003 173/104 |
| 7,252,155 | B2 * | 8/2007 | Goetzfried | B23B 51/042 173/132 |
| 7,284,622 | B2 * | 10/2007 | Hahn | B25D 17/088 173/132 |
| 7,360,606 | B2 * | 4/2008 | Saur | B25D 17/088 173/132 |
| 7,694,750 | B2 * | 4/2010 | Tsubakimoto | B25D 17/06 173/13 |
| 7,921,933 | B2 * | 4/2011 | Hamano | B25D 17/06 173/205 |
| 7,997,837 | B2 * | 8/2011 | Furusawa | B23Q 3/12 408/239 R |
| 9,272,408 | B2 * | 3/2016 | Koch | B25D 17/24 |
| 9,289,890 | B2 * | 3/2016 | Ludy | B25D 11/04 |
| 11,007,631 | B2 * | 5/2021 | Didier | B25D 16/00 |
| 11,148,272 | B2 * | 10/2021 | Yoshikane | B25D 16/00 |
| 2001/0013683 | A1 * | 8/2001 | Yahagi | B25D 17/088 279/75 |
| 2014/0116739 | A1 | 5/2014 | Ludy et al. | |
| 2016/0167212 | A1 | 6/2016 | Wyler et al. | |
| 2019/0160636 | A1 | 5/2019 | Hirabayashi et al. | |
| 2021/0094158 | A1 | 4/2021 | Kato et al. | |

FOREIGN PATENT DOCUMENTS

| | | | | |
|---|---|---|---|---|
| WO | WO-2012094800 | A1 * | 7/2012 | B25D 17/06 |
| WO | WO-2019042869 | A1 * | 3/2019 | |

* cited by examiner

CHISEL HAMMER

CROSS-REFERENCE TO RELATED APPLICATIONS

This application claims priority to U.S. Provisional Patent Application No. 63/191,570, filed May 21, 2021, the entire content of each of which is hereby incorporated by reference.

FIELD OF THE DISCLOSURE

The present invention relates to power tools, and more specifically to chisel hammers.

BACKGROUND OF THE DISCLOSURE

Chisel hammers typically impart repeating axial impacts on a tool bit (e.g., a chisel bit) for performing work on a work piece.

SUMMARY OF THE DISCLOSURE

The present disclosure provides, in one aspect, a power tool adapted to impart axial impacts to a tool bit. The power tool includes a housing, an electric motor supported in the housing, and a barrel supported by the housing. The power tool also includes a reciprocation drive assembly coupled to the electric motor and configured to convert torque from the electric motor to reciprocating motion of a piston that is at least partially received within the barrel for reciprocation therein along a reciprocation axis. The power tool further includes a striker received within the barrel for reciprocation in response to reciprocation of the piston. The power tool also includes an anvil at least partially received within the barrel and positioned between the striker and the tool bit. The anvil is configured to communicate axial impacts to the tool bit in response to reciprocation of the striker. The anvil defines an opening and an inner bore that communicates with the opening, and the inner bore at least partially receives a shank of the tool bit.

In some embodiments, the power tool further comprises a retainer received within the barrel for selectively securing the striker in an idle position in which it is inhibited from reciprocating within the spindle. The retainer includes an inner circumferential wall that defines a central bore extending therethrough along the reciprocation axis. The central bore at least partially receives the shank of the tool bit.

The present disclosure provides, in another aspect, a power tool adapted to impart axial impacts to a tool bit. The power tool includes a housing, an electric motor supported in the housing, and a barrel supported by the housing. The power tool also includes a reciprocation drive assembly coupled to the electric motor and configured to convert torque from the electric motor to reciprocating motion of a piston that is at least partially received within the barrel for reciprocation therein along a reciprocation axis. The power tool further includes a striker received within the barrel for reciprocation in response to reciprocation of the piston. The power tool also includes an anvil at least partially received within the barrel and positioned between the striker and the tool bit. The anvil is configured to communicate axial impacts to the tool bit in response to reciprocation of the striker. The power tool further includes a retainer received within the barrel and configured to selectively secure the striker in an idle position in which it is inhibited from reciprocating within the barrel. The retainer includes an inner circumferential wall that defines a central bore extending therethrough along the reciprocation axis. The central bore at least partially receives a shank of the tool bit.

The present disclosure provides, in another aspect, a power tool adapted to impart axial impacts to a tool bit. The power tool includes a housing, an electric motor supported in the housing, and a barrel supported by the housing. The power tool also includes a reciprocation drive assembly coupled to the electric motor and configured to convert torque from the electric motor to reciprocating motion of a piston that is at least partially received within the barrel for reciprocation therein along a reciprocation axis. The power tool further includes a striker received within the barrel for reciprocation in response to reciprocation of the piston. The power tool also includes an anvil at least partially received within the barrel and positioned between the striker and the tool bit. The anvil is configured to communicate axial impacts to the tool bit in response to reciprocation of the striker. The power tool further includes a tool holder supported adjacent the barrel and configured to support the tool bit. The tool holder includes a quick-connect mechanism having a sleeve movable between a release position at which the tool bit is removable from the tool holder, and a locking position at which the tool bit is non-removably secured by the tool holder.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
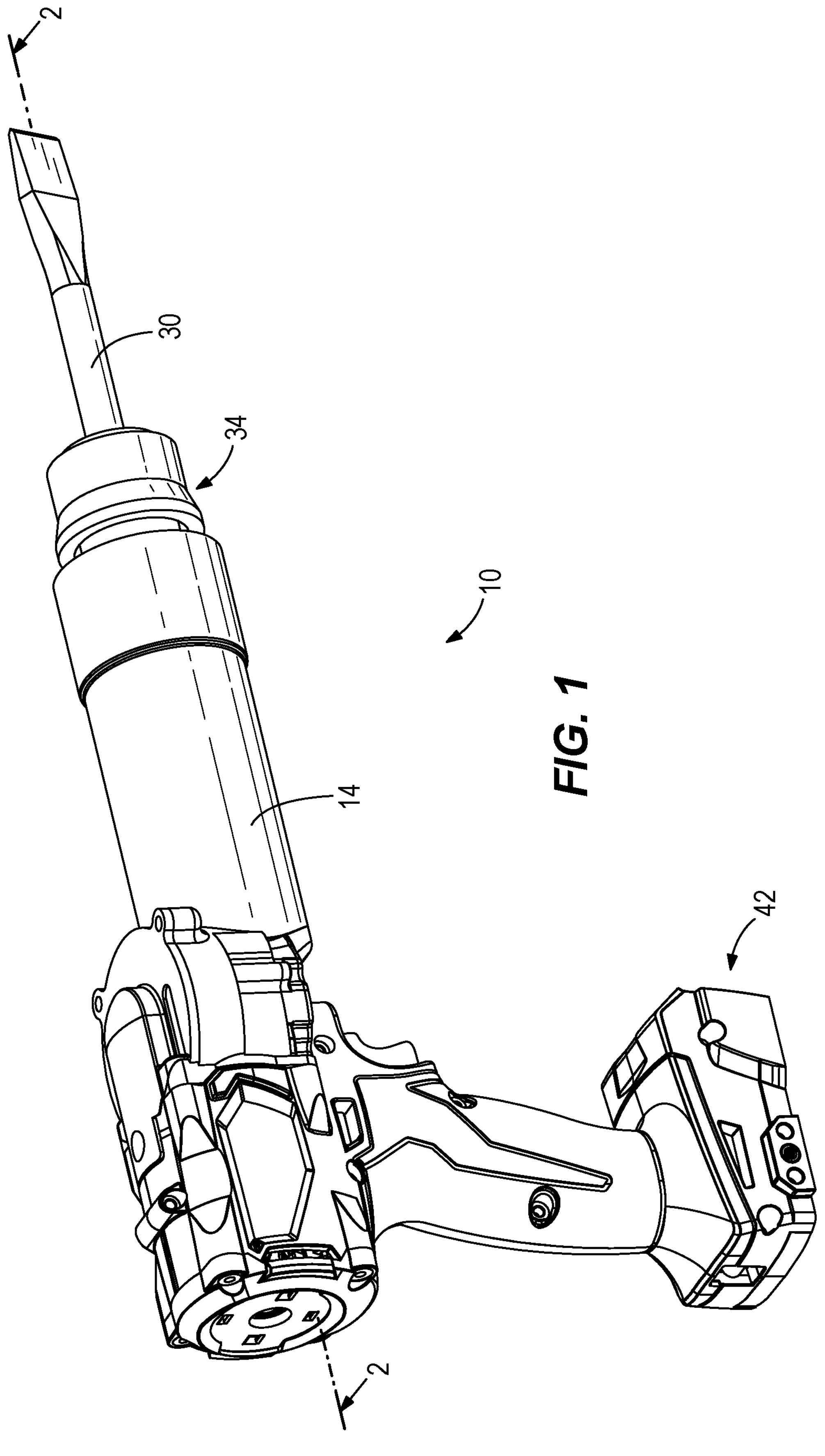
FIG. 1 is a side perspective view of a chisel hammer in accordance with an embodiment of the disclosure.
Figure 2:
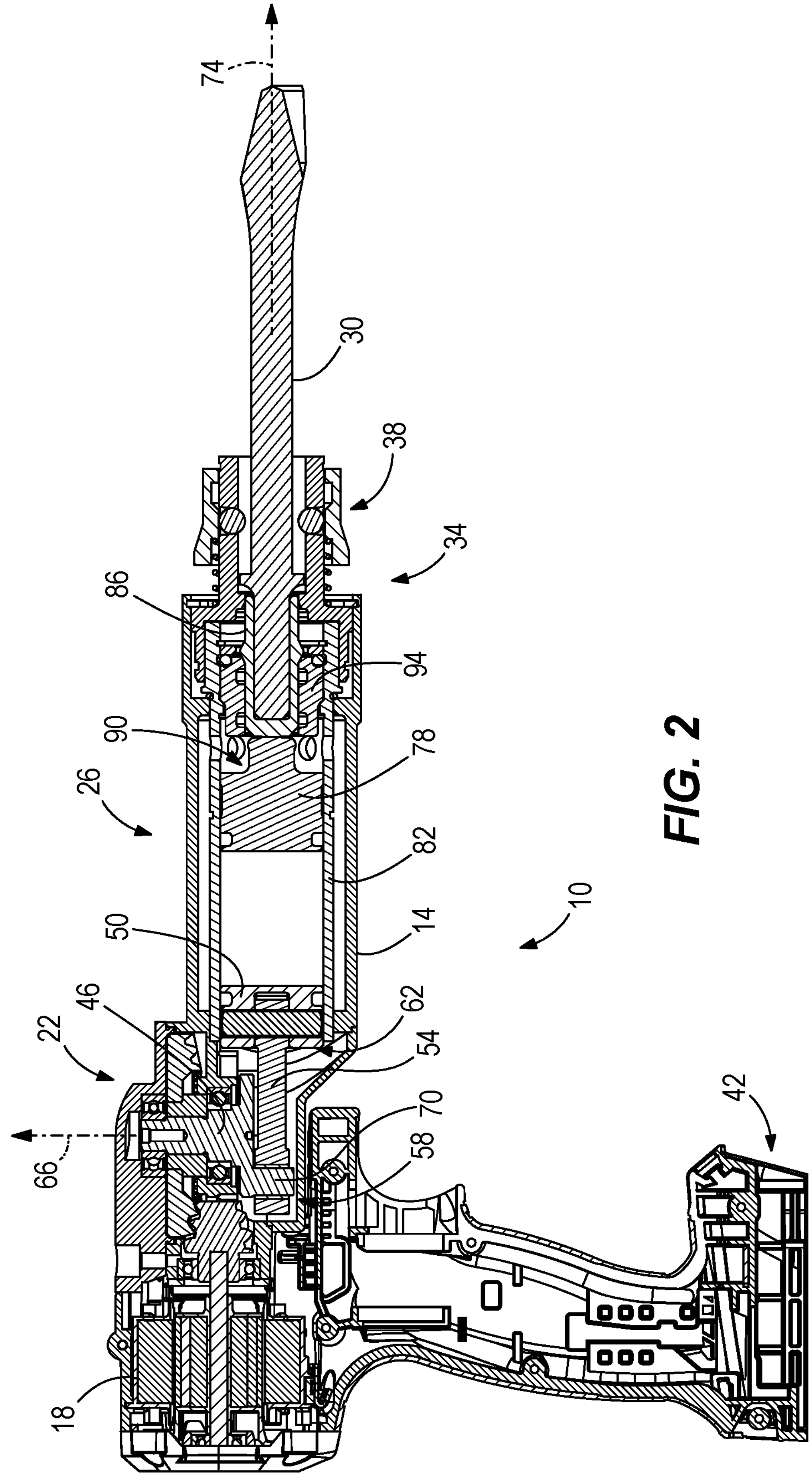
FIG. 2 is a cross-sectional view of the chisel hammer of FIG. 1 taken along line 2-2 of FIG. 1.
Figure 3:
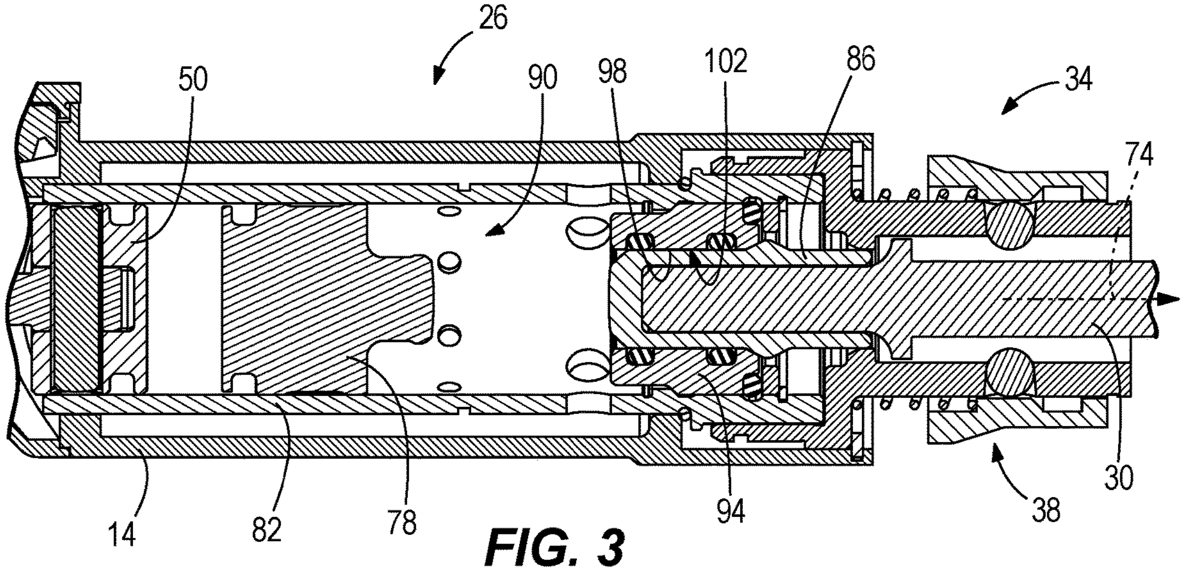
FIGS. 3 and 4 are enlarged cross-sectional views of portions of the chisel hammer shown in FIG. 2, illustrating the chisel hammer in a "hammer" mode.

FIGS. 1-2 illustrate a power tool in the form of a hammer tool or chisel hammer 10. The chisel hammer 10 includes a housing 14 and a motor 18 disposed within the housing 14. With continued reference to FIGS. 2 and 3, the chisel hammer 10 also includes a reciprocation drive assembly 22 coupled to the motor 18 for converting torque from the motor 18 to reciprocating motion, and an impact mechanism 26 coupled to the reciprocation drive assembly 22 to impart repeating axial impacts on a tool bit 30 (e.g., a chisel bit). As shown in FIG. 1, the tool bit 30 may be slidably supported by a tool holder 34 coupled to the housing 14 such that the tool bit 30 is permitted to translate along its axis to impart the axial impacts to a work piece. In the illustrated construction, the chisel hammer 10 includes a quick-connect mechanism 38 coupled to the tool holder 34 to facilitate quick removal and replacement of different tool bits 30.

In the illustrated construction of the chisel hammer 10, the motor 18 is configured as a DC motor 18 that receives power from an on-board power source (e.g., a battery pack; not shown). The housing 14 defines a battery receptacle 42 that detachably receives the battery pack. The battery pack may include any of a number of different nominal voltages (e.g., 12V, 18V, etc.), and may be configured having a Lithium-based chemistry (e.g., Lithium, Lithium-ion, etc.) or any other suitable chemistry. Alternatively, the motor 18 may be powered by a remote power source (e.g., a household electrical outlet) through a power cord. The motor 18 is selectively activated by depressing a trigger (not shown) which, in turn, actuates a switch (not shown). The switch may be electrically connected to the motor 18 via a top-level or master controller, or one or more circuits, for controlling operation of the motor 18.

With reference to FIG. 2, in the illustrated embodiment, the reciprocation drive assembly 22 is configured as a slider crank mechanism that includes a crankshaft 46, a reciprocating piston 50, and a connecting rod 54 pivotably coupled to the crankshaft 46 at a first end 58 and pivotably coupled to the piston 50 at a second end 62. The crankshaft 46 receives torque from the motor 18 and rotates about a crankshaft axis 66. The crankshaft 46 includes a crank pin 70 that couples to the first end 58 of the connecting rod 54. As the crankshaft 46 rotates about the crankshaft axis 66, the connecting rod 54 drives the piston 50 to reciprocate along a reciprocation axis 74 and within a barrel 82 supported within the housing 14.

In other embodiments (not shown), the reciprocation drive assembly 22 can be realized by other mechanisms commonly employed to convert rotational motion to reciprocating motion (e.g., a scotch-yoke mechanism, a wobble drive mechanism, a swash plate mechanism, etc.).

The impact mechanism 26 also includes a striker 78 that is selectively reciprocable within the barrel 82 in response to reciprocation of the piston 50, and an anvil 86 that is impacted by the striker 78 when the striker 78 reciprocates toward the tool bit 30. The impact between the striker 78 and the anvil 86 is transferred to the tool bit 30, causing it to reciprocate for performing work on a work piece. In the illustrated construction of the chisel hammer 10, the barrel 82 is hollow and defines an interior chamber 90 in which the striker 78 is received. An air pocket is developed between the piston 50 and the striker 78 when the piston 50 reciprocates within the barrel 82, whereby expansion and contraction of the air pocket induces reciprocation of the striker 78.

Figure 4:
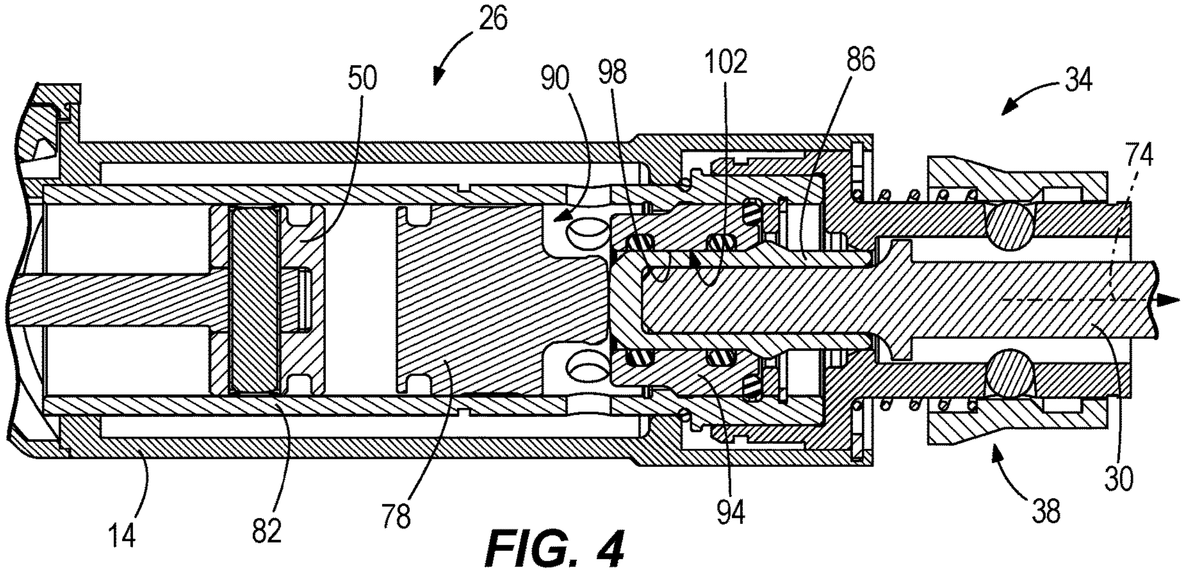
Figure 5:
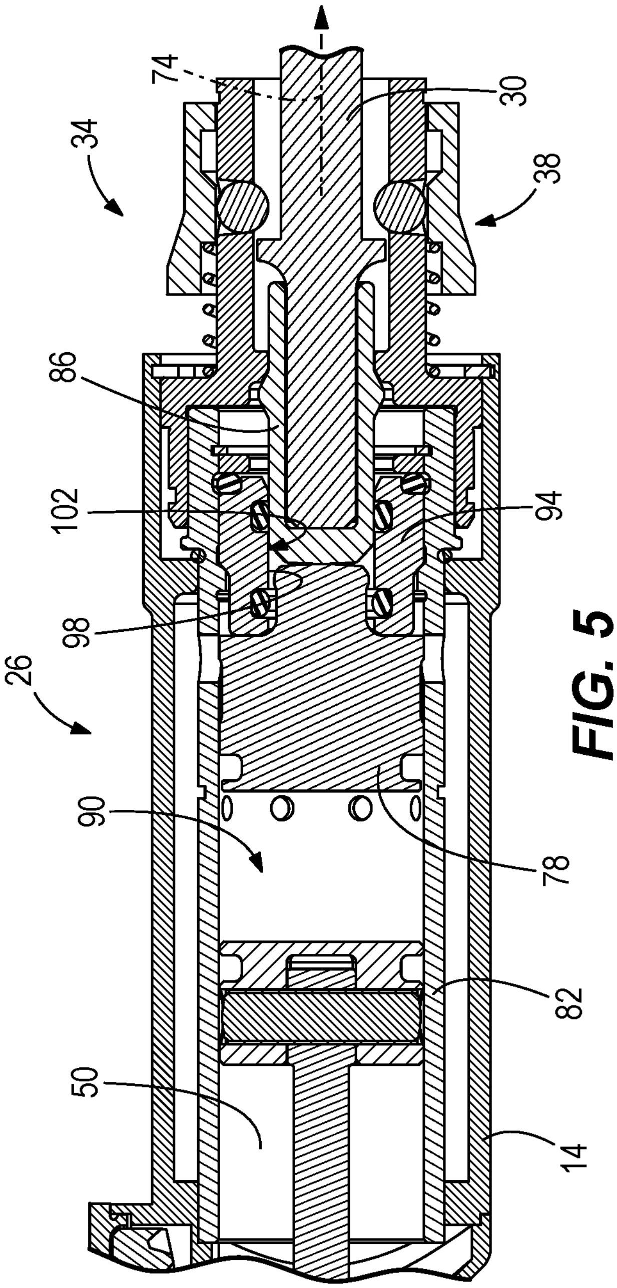
FIGS. 5-7 are enlarged cross-sectional views of portions of the chisel hammer shown in FIG. 2, illustrating the chisel hammer in an "idle" mode.

With reference to FIGS. 3-7, the impact mechanism 26 further includes a retainer 94 for securing the striker 78 in an "idle" position (shown in FIG. 5) in which the striker 78 is inhibited from reciprocating within the barrel 82. The retainer 94 includes an inner circumferential wall 98 that defines a central bore 102 extending through the retainer 94 along a direction of the reciprocation axis 74. A first inner circumferential groove 106 is defined in the inner circumferential wall 98 proximate the striker 78, and a second inner circumferential groove 110 is defined in the inner circumferential wall 98 proximate the tool holder 34. A friction member 114 (e.g., an O-ring) is received into the first inner circumferential groove 106 and protrudes partially into the central bore 102. The striker 78 includes a barb 118 engageable with the friction member 114 in the retainer 94 when assuming the idle position as shown in FIG. 5. The second inner circumferential groove 110 receives a ring-shaped seal member 122 (e.g., an O-ring) that creates a seal against an outer circumferential surface 126 of the anvil 86.

Figure 6:
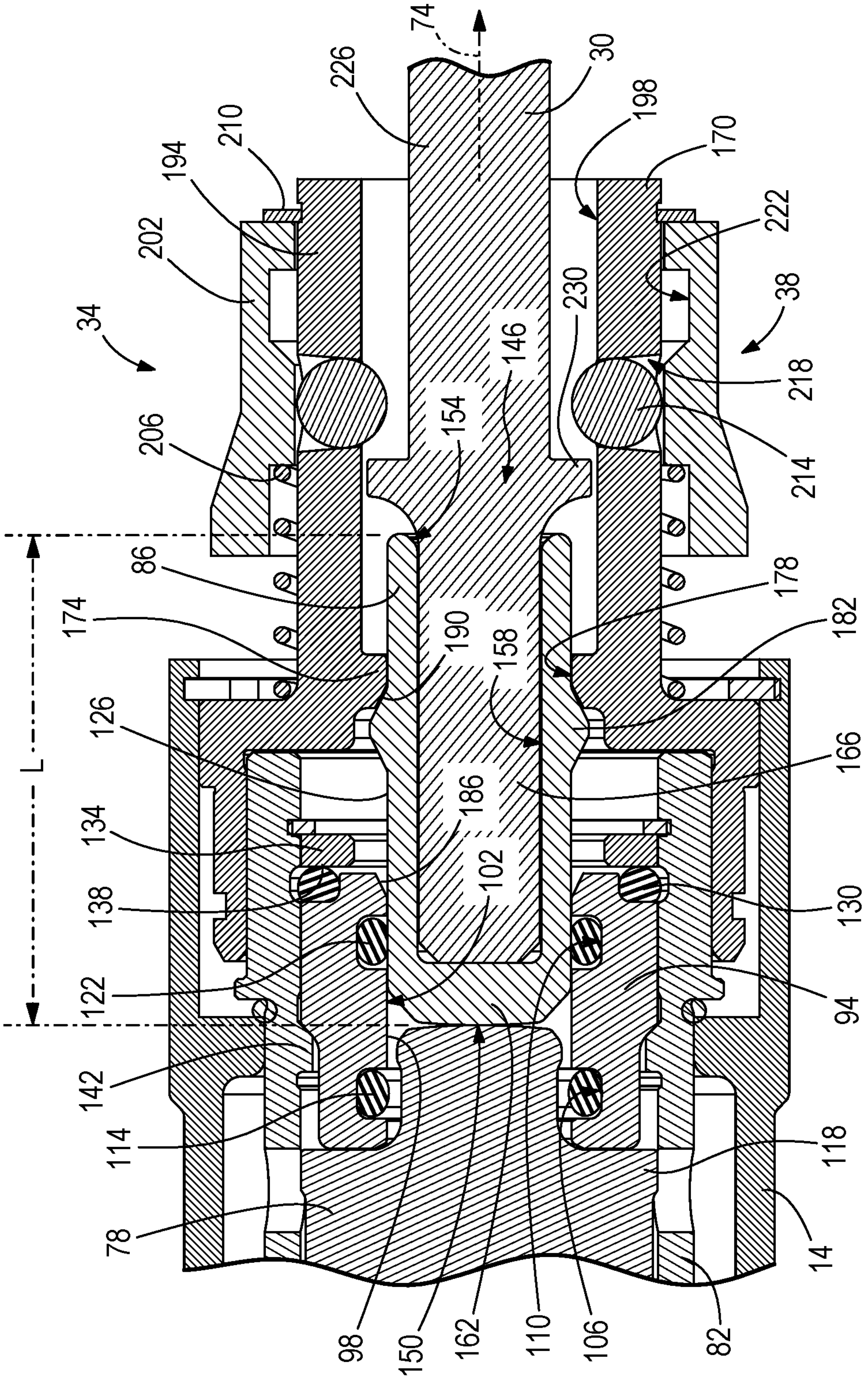
Figure 7:
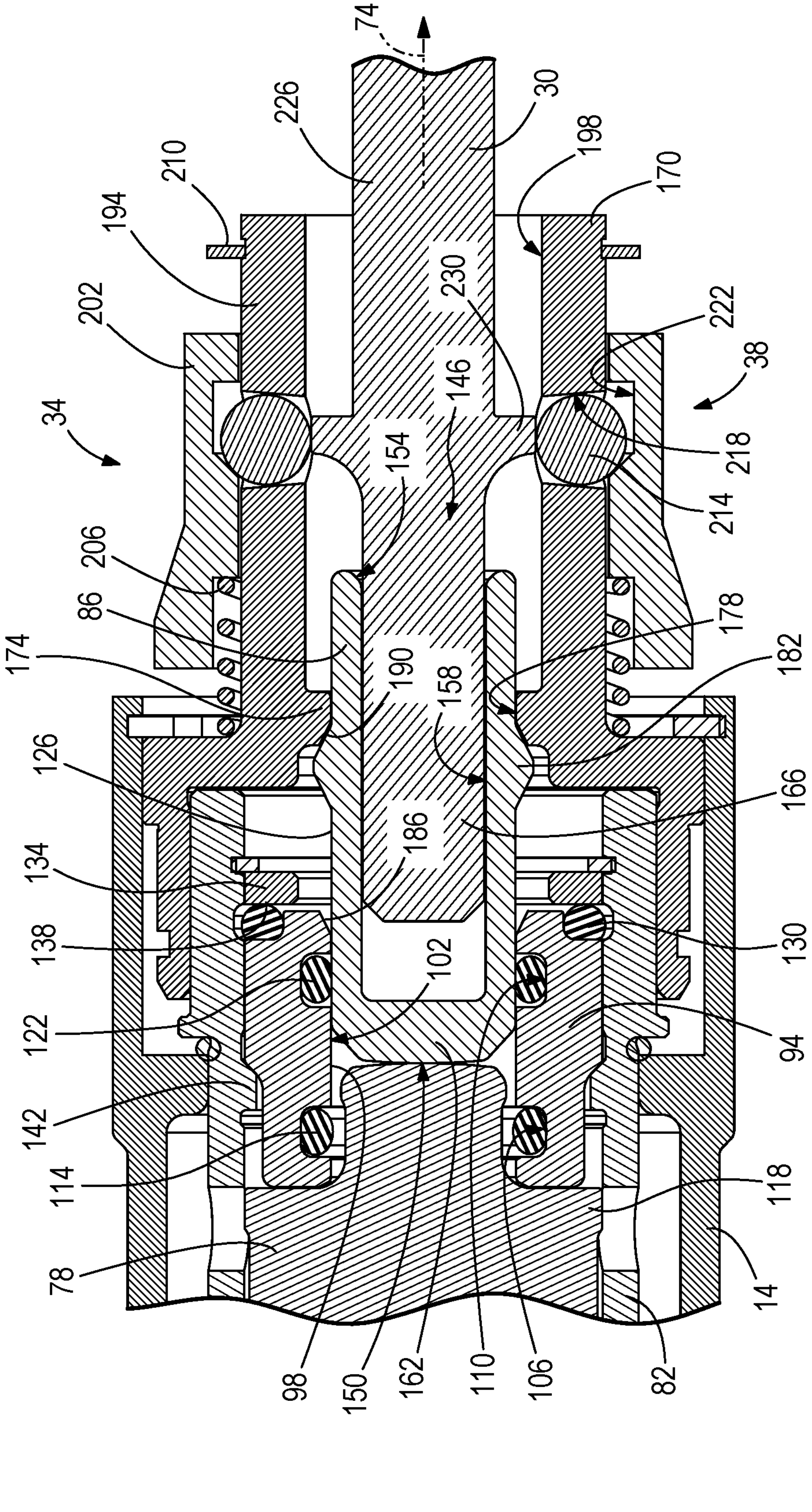

With reference to FIG. 6, an elastic member 130 is positioned between the retainer 94 and the barrel 82. Particularly, the barrel 82 includes a step 134 defining an interior annular surface 138, and the elastic member 130 is positioned between the retainer 94 and the annular surface 138 of the barrel 82. A circumferential rib 142 protrudes radially inward from the barrel 82 and defines a rearward extent to which the retainer 94 is movable relative to the barrel 82 along the reciprocation axis 74.

When the tool bit 30 of the chisel hammer 10 is depressed against a work piece, the chisel hammer 10 operates in a "hammer" mode, in which the striker 78 repeatedly impacts the anvil 86, causing the tool bit 30 to reciprocate for performing work on the work piece. Specifically, the tool bit 30 pushes the striker 78 (via the anvil 86) rearward toward an "impact" position, shown in FIG. 4. During operation of the chisel hammer 10, the piston 50 reciprocates within the barrel 82 to draw the striker 78 rearward (FIG. 3) and then accelerate it forward toward the anvil 86 for impact (FIG. 4). When the tool bit 30 is removed from the work piece, the chisel hammer 10 may transition from the hammer mode to an "idle" mode, in which the striker 78 is captured by the retainer 94 in the idle position shown in FIG. 5 and prevented from further reciprocation within the barrel 82. To assume the idle position, the striker 78 moves forward toward the retainer 94 so that the barb 118 enters the central bore 102 and engages the friction member 114 as shown in FIG. 5.

With reference to FIG. 6, the anvil 86 is formed as an elongated tubular body having a forward-facing open end 146 and a rearward-facing closed end 150. The open end 146 defines an opening 154, and an inner bore 158 extends from the opening 154 to a bottom wall 162 formed at the closed end 150. The inner bore 158 receives a shank 166 of the tool bit 30. The anvil 86 includes a length L measured between the open end 146 and the closed end 150. In the illustrated embodiment, the inner bore 158 extends along a majority of the length L of the anvil 86 between the open end 146 and the closed end 150. As such, when the shank 166 of the tool bit 30 is received into the inner bore 158, the shank 166 extends at least partially into the central bore 102 of the retainer 94 both when the anvil 86 is in a hammer position (FIG. 4) and an idle position (FIGS. 5 and 6). In other embodiments (not shown) the inner bore 158 can extend e.g., at least half of the length L between the open end 146 and the closed end 150, or less than half of the length L between the open end 146 and the closed end 150. Since the shank 166 of the tool bit 30 is received at least partially into the anvil 86, an overall length of the chisel hammer 10 along a direction of the reciprocation axis 74 is reduced as compared to known traditional chisel hammers.

With continued reference to FIG. 6, the tool holder 34 includes a case 170 that is affixed to the barrel 82 and that receives a portion of the tool bit 30. The case 170 partially closes the barrel 82 at a forward end and includes a circumferential inwardly-protruding tool holder rib 174 that defines an anvil aperture 178. The anvil aperture 178 receives a portion of the anvil 86 therethrough by sliding fit when the anvil 86 is in each of the hammer position (FIG. 4) and the idle position (FIG. 6). In this regard, the case 170 and the anvil 86 cooperate to close the barrel 82 at the forward end thereof. The tool holder rib 174 creates a relatively tight seal against the outer circumferential surface 126 of the anvil 86 that resists dirt, dust, and other debris from entering the barrel 82. In contrast, many typical known chisel hammers create a seal between the tool holder and the shank of the tool bit itself (rather than the anvil) to prevent dirt and debris from entering the barrel.

The anvil 86 also includes a circumferential anvil rib 182 protruding radially outward from the outer circumferential surface 126 and located part-way between the open end 146 and the closed end 150. The anvil rib 182 abuts against a first stopping surface 186 of the retainer 94 when the anvil 86 is at the hammer position (FIG. 4) to define a rearward movable extent of the anvil 86 along the reciprocation axis 74. And, the anvil rib 182 abuts against a second stopping surface 190 of the tool holder rib 174 when the anvil 86 is at the idle position (FIG. 6) to define a forward movable extent of the anvil 86 along the reciprocation axis 74.

The case 170 also includes a tubular wall 194 that supports the quick-connect mechanism 38. The tubular wall 194 defines a recess or receptacle 198 that receives the shank 166 of the tool bit 30. The quick-connect mechanism 38 includes a retractable sleeve 202 that is slidably received about the tubular wall 194 and forwardly biased toward a locking position (FIG. 6) by a biasing member embodied as a sleeve spring 206. The sleeve 202 is retained at the locking position by a retaining ring 210. The quick-connect mechanism 38 also includes detent members embodied as latch balls 214 that are received by tapered ball recesses 218 defined in the tubular wall 194. The latch balls 214 are urged radially inward by the sleeve 202 when the sleeve 202 is located in the forward, locking position (FIG. 6). The sleeve 202 is movable to a release position (FIG. 7) by retracting the sleeve 202 rearward against the biasing force of the sleeve spring 206. In the release position, a circumferential latch groove 222 defined in the sleeve 202 aligns with the ball recesses 218, and the latch balls 214 are permitted to displace radially outward such that they are partially received into the latch groove 222.

The tool bit 30 further includes a shaft 226 and a radial flange 230 located between the shank 166 and the shaft 226. The flange 230 has a larger outside diameter than that of the shank 166 and that of the shaft 226. Likewise, the outside diameter of the flange 230 is larger than a distance measured between opposing pairs of the latch balls 214 when the sleeve 202 is in the locking position (FIG. 6). As such, when the tool bit 30 is installed in the tool holder 34, the latch balls 214 engage the flange 230 to prevent the tool bit 30 from being removed from the tool holder 34. In order to remove the tool bit 30 from the tool holder 34, the sleeve 202 is retracted from the locking position and held at release position (FIG. 7), and then the tool bit 30 is pulled forwardly out of the receptacle 198. As the flange 230 engages the latch balls 214 during removal, the flange 230 pushes the latch balls 214 radially outward such that the latch balls 214 are partially received into the latch groove 222. To install the tool bit 30 into the tool holder 34, the sleeve 202 is held at the release position (FIG. 7), and the shank 166 of the tool bit 30 is inserted into the receptacle 198 and pressed inward until the flange 230 slides beyond the latch balls 214 and the shank 166 slides into the inner bore 158 of the anvil 86. The sleeve 202 can then be released, and the sleeve spring 206 urges the sleeve 202 back to the locking position to secure the tool bit 30 within the tool holder 34.

Figure 8A:
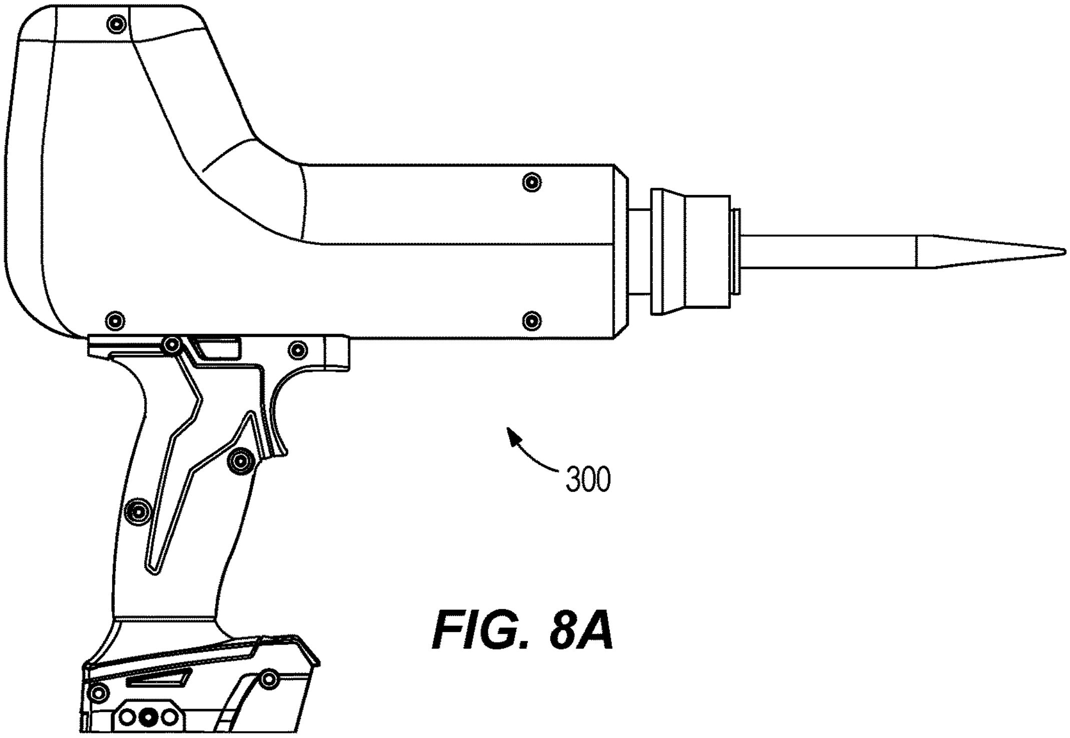
FIG. 8A is a side view of a chisel hammer according to another embodiment.
Figure 8B:
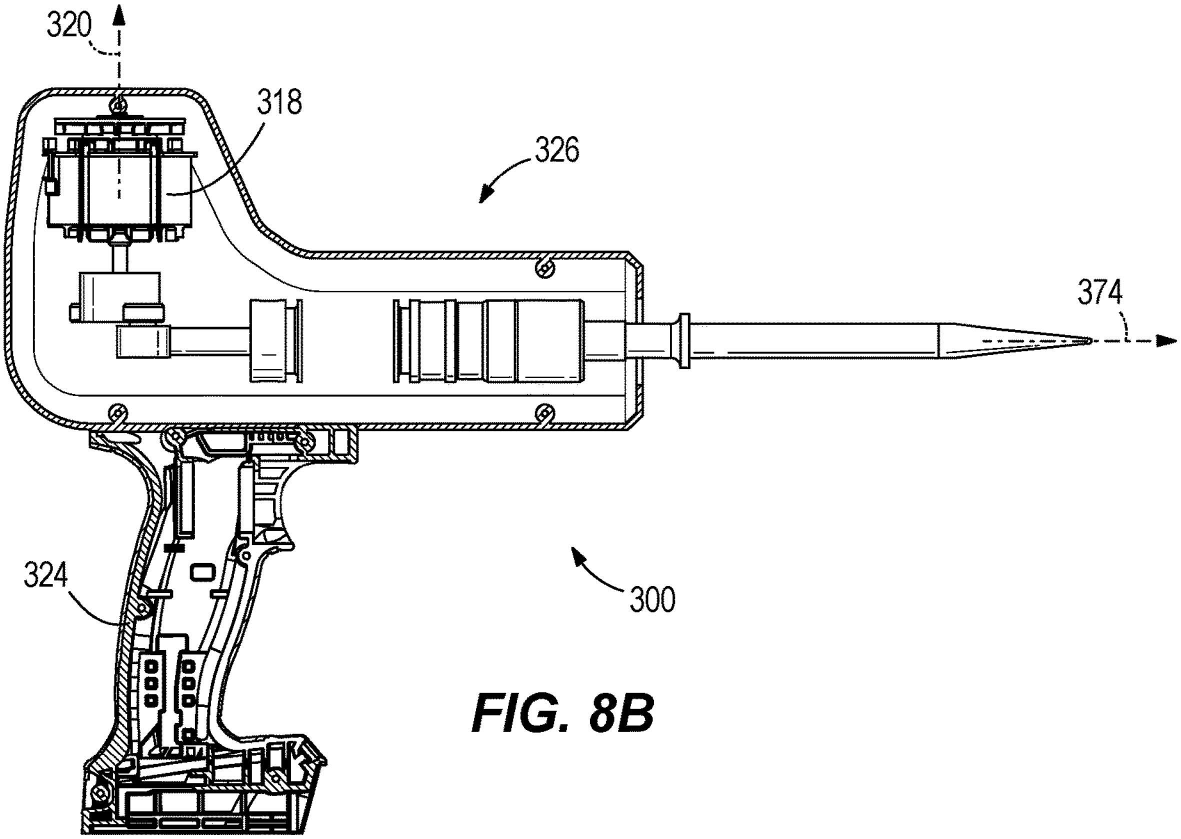
FIG. 8B is a side view of the chisel hammer of FIG. 8A with portions removed.

FIGS. 8A and 8B illustrate a chisel hammer 300 according to another embodiment. The chisel hammer 300 includes an impact mechanism 326 defining a reciprocation axis 374, a motor 318 defining a motor axis 320, and a handle 324. The motor axis 320 extends perpendicular to the reciprocation axis 374, the motor 318 is located above the reciprocation axis 374 as viewed in FIG. 8B, and the handle 324 is located below the reciprocation axis 374 as viewed in FIG. 8B.

Figure 9A:
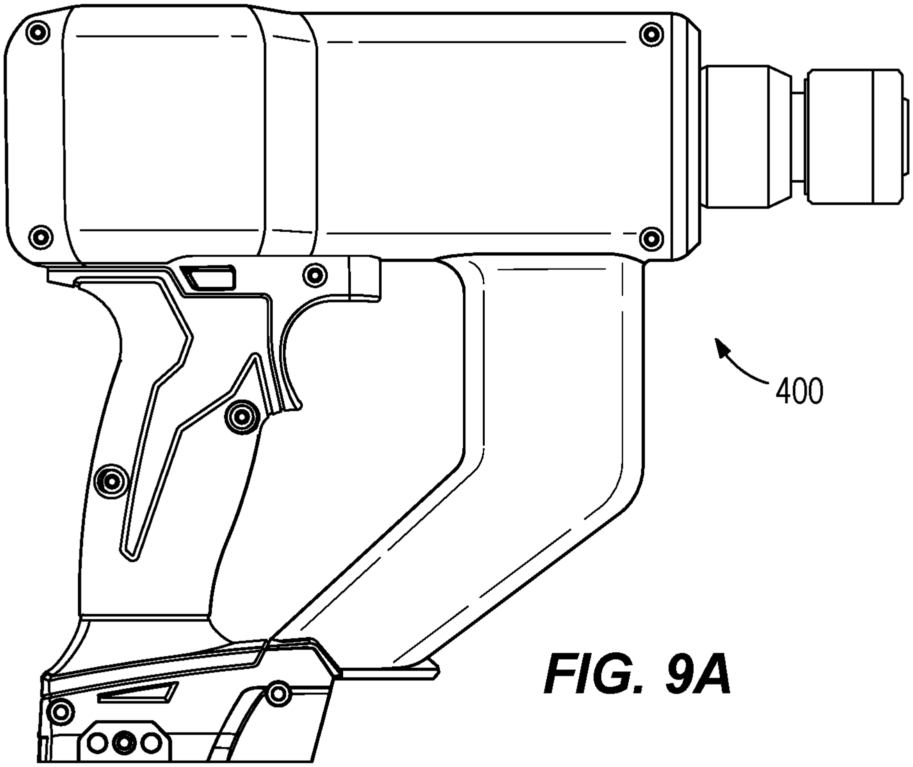
FIG. 9A is a side view of a chisel hammer according to another embodiment.
Figure 9B:
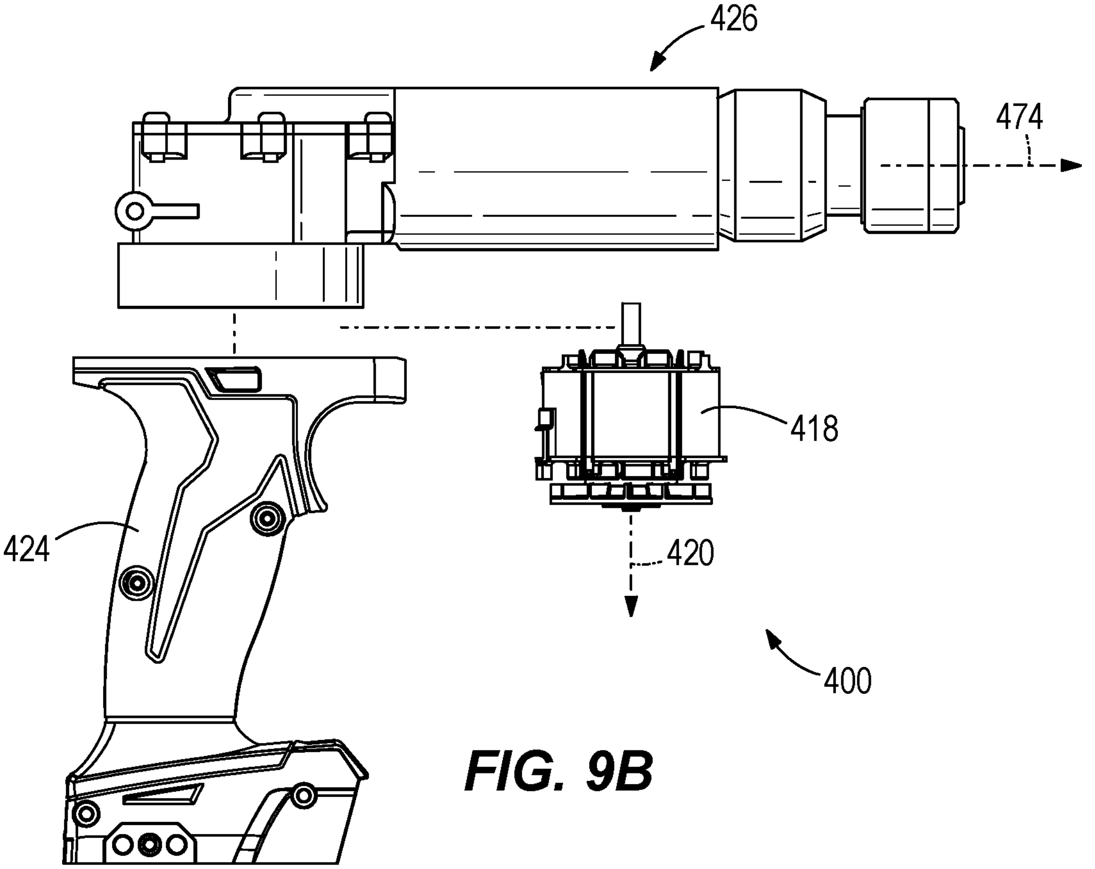
FIG. 9B is a side view of the chisel hammer of FIG. 9A with portions removed.

FIGS. 9A and 9B illustrate a chisel hammer 400 according to another embodiment. The chisel hammer 400 includes an impact mechanism 426 defining a reciprocation axis 474, a motor 418 defining a motor axis 420, and a handle 424. The motor axis 420 extends perpendicular to the reciprocation axis 474, the motor 418 is located below the reciprocation axis 474 as viewed in FIG. 9B, and the handle 424 is located below the reciprocation axis 474 as viewed in FIG. 9B.

Figure 10A:
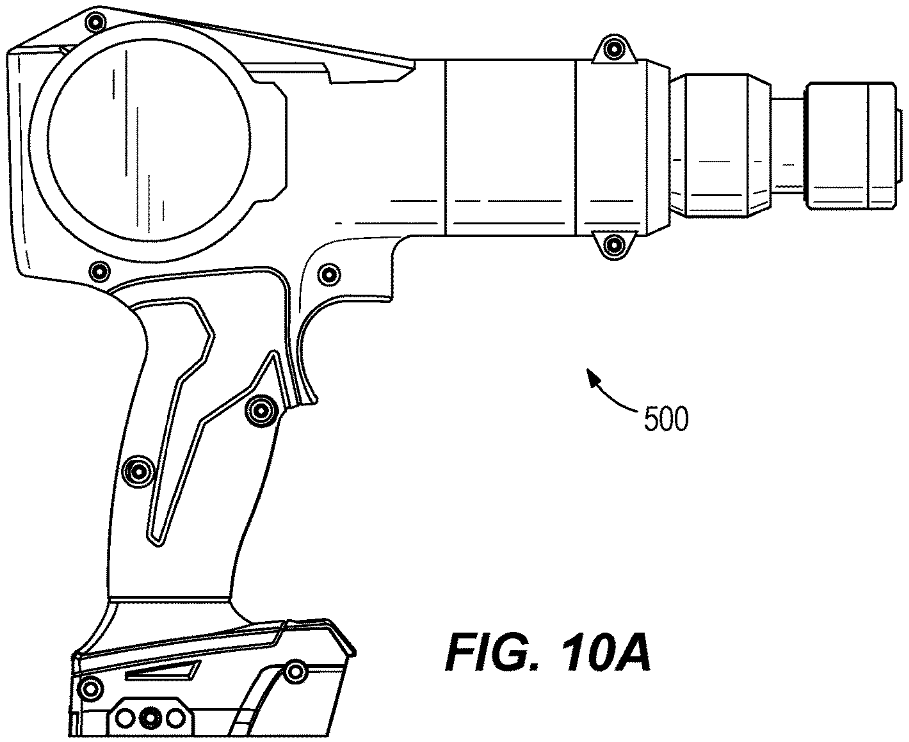
FIG. 10A is a side view of a chisel hammer according to another embodiment.
Figure 10B:
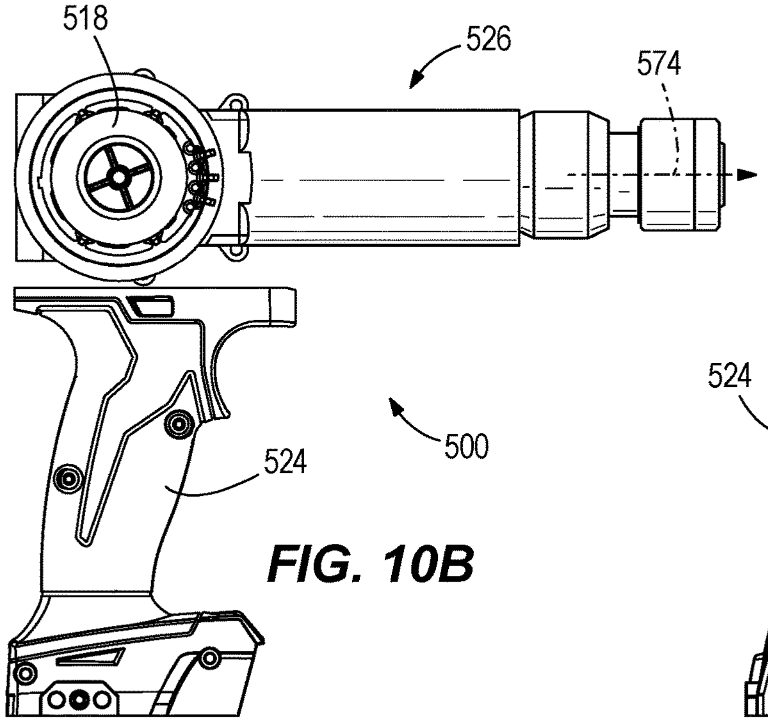
FIG. 10B is a side view of the chisel hammer of FIG. 10A with portions removed.
Figure 10C:
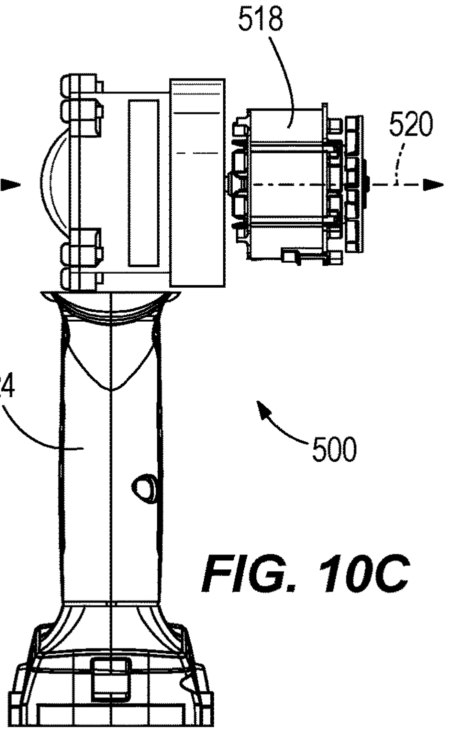
FIG. 10C is a rear view of the chisel hammer of FIG. 10A with portions removed.

FIGS. 10A-10C illustrate a chisel hammer 500 according to another embodiment. The chisel hammer 500 includes an impact mechanism 526 defining a reciprocation axis 574, a motor 518 defining a motor axis 520, and a handle 524. The motor axis 520 extends perpendicular to the reciprocation axis 574, the motor 518 is located laterally offset from a plane of the impact mechanism 526 and the handle 524, and the handle 524 is located below the reciprocation axis 574 as viewed in FIG. 8B.

Figure 11:
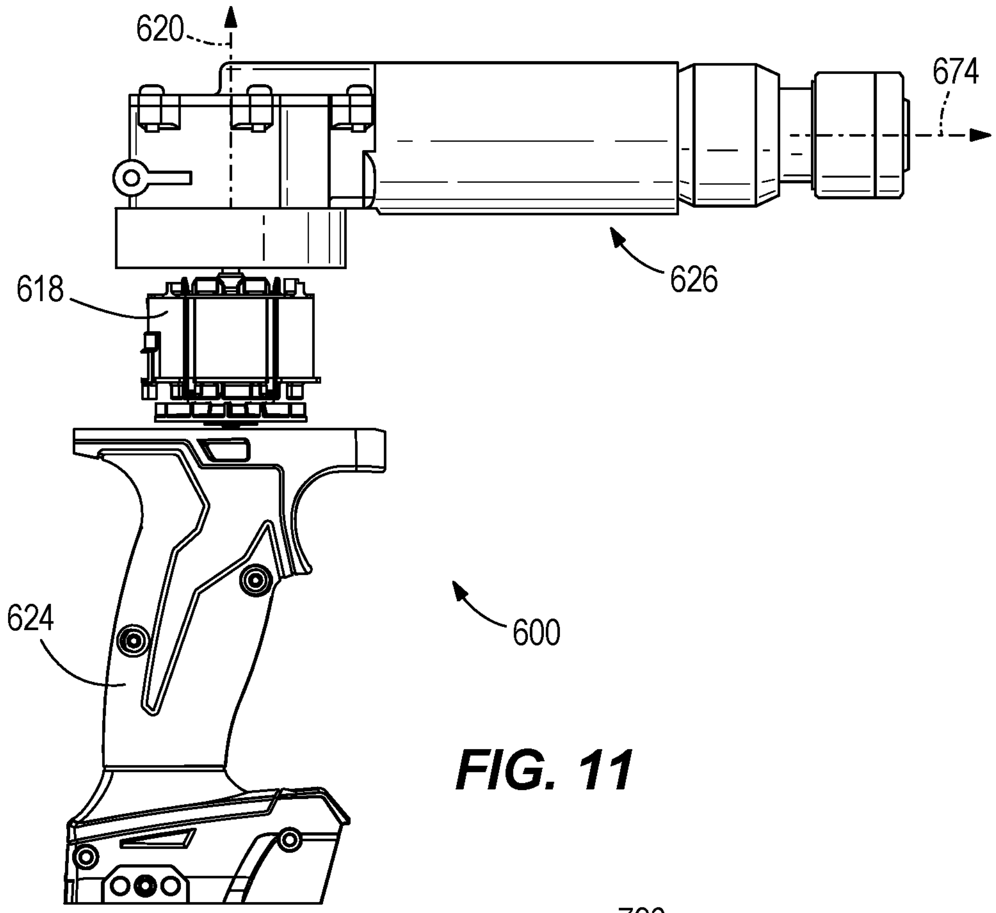
FIG. 11 is a side view of a chisel hammer according to another embodiment with portions removed.

FIG. 11 illustrates a chisel hammer 600 according to another embodiment. The chisel hammer 600 includes an impact mechanism 626 defining a reciprocation axis 674, a motor 618 defining a motor axis 620, and a handle 624. The motor axis 620 extends perpendicular to the reciprocation axis 674, the motor 618 is located below the reciprocation axis 674 as viewed in FIG. 11, and the handle 624 is located below the reciprocation axis 474 and below the motor 618 as viewed in FIG. 11.

Figure 12:
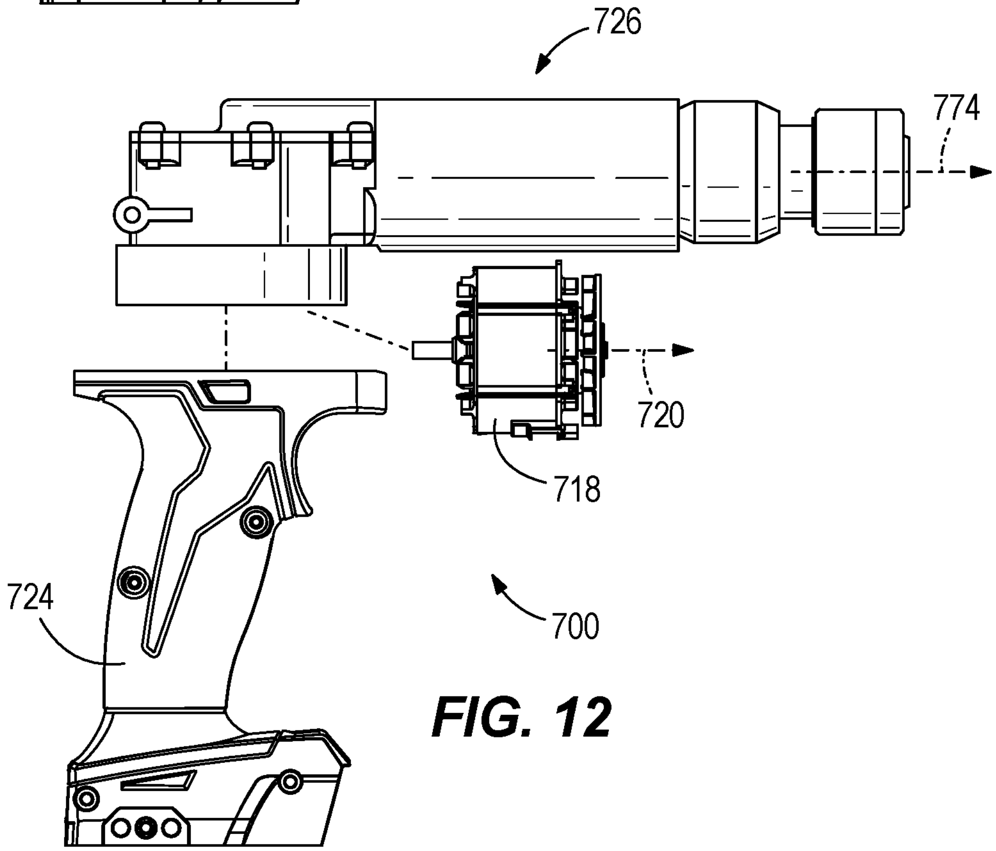
FIG. 12 is a side view of a chisel hammer according to another embodiment with portions removed.

FIG. 12 illustrates a chisel hammer 700 according to another embodiment. The chisel hammer 700 includes an impact mechanism 726 defining a reciprocation axis 774, a motor 718 defining a motor axis 720, and a handle 724. The motor axis 720 extends parallel to the reciprocation axis 774, the motor 718 is located below the reciprocation axis 774 and forward of the handle 724 as viewed in FIG. 12, and the handle 724 is located below the reciprocation axis 774 as viewed in FIG. 12.

Figure 13A:
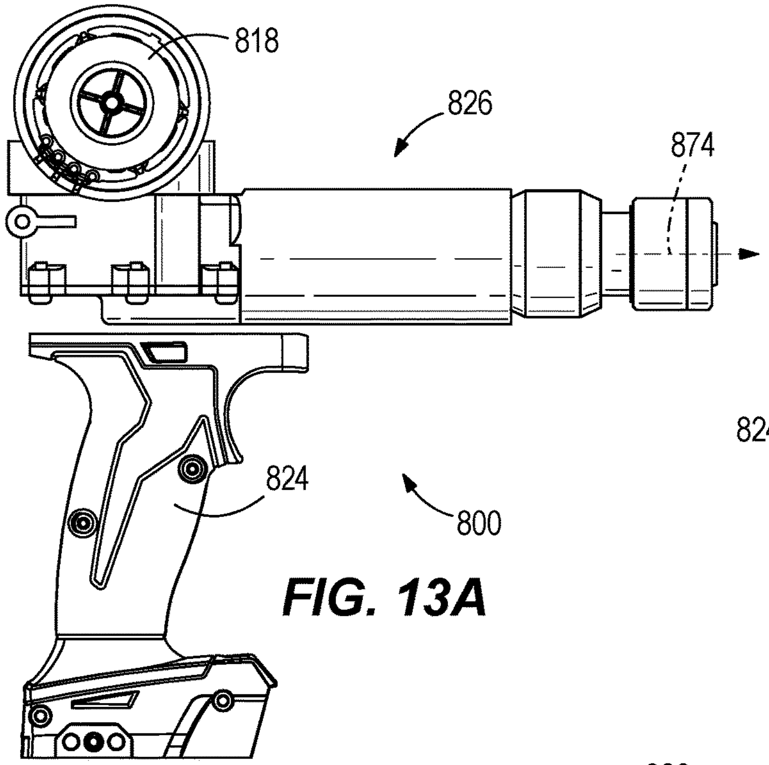
FIG. 13A is a side view of a chisel hammer according to another embodiment with portions removed.
Figure 13B:
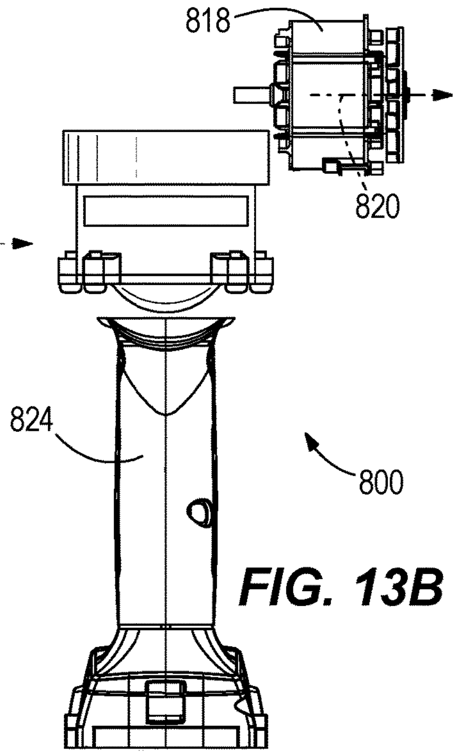
FIG. 13B is a rear view of the chisel hammer of FIG. 13A with portions removed.

FIGS. 13A and 13B illustrate a chisel hammer 800 according to another embodiment. The chisel hammer 800 includes an impact mechanism 826 defining a reciprocation axis 874, a motor 818 defining a motor axis 820, and a handle 824. The motor axis 820 extends perpendicular to the reciprocation axis 874, the motor 818 is located above the reciprocation axis 874 as viewed in FIGS. 13A and 13B and laterally offset from a plane of the impact mechanism 826 and the handle 824, and the handle 824 is located below the reciprocation axis 874 as viewed in FIG. 13A.

Figure 14:
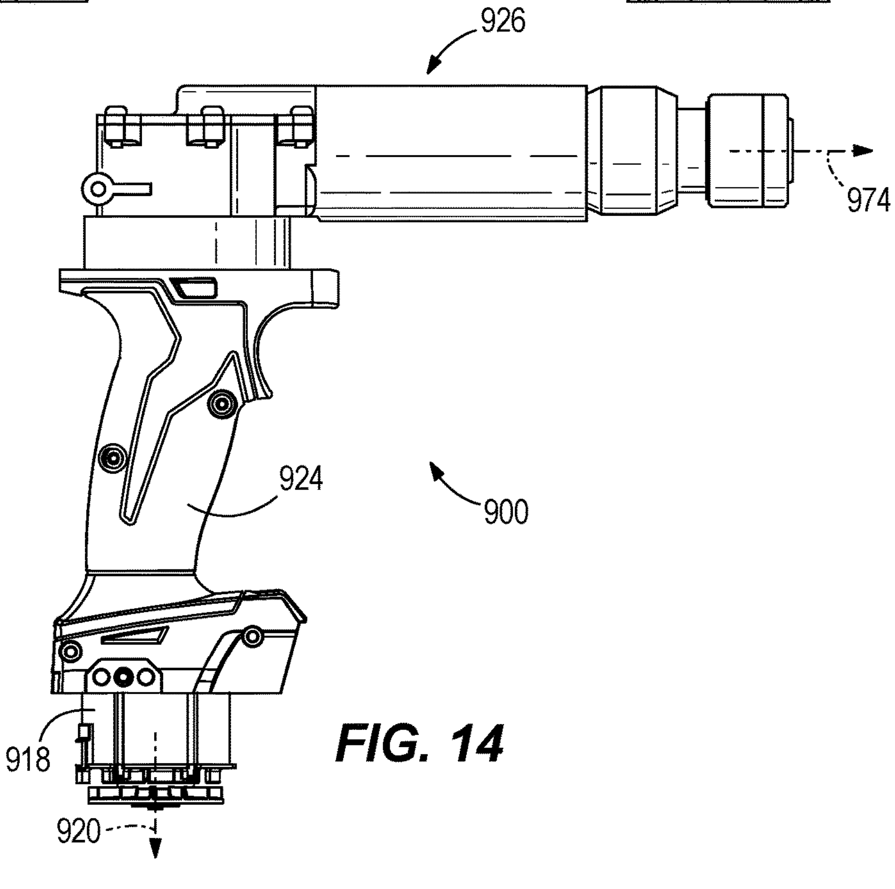
FIG. 14 is a side view of a chisel hammer according to another embodiment with portions removed.

FIG. 14 illustrates a chisel hammer 900 according to another embodiment. The chisel hammer 900 includes an impact mechanism 926 defining a reciprocation axis 974, a motor 918 defining a motor axis 920, and a handle 924. The motor axis 920 extends perpendicular to the reciprocation axis 974, the motor 918 is located below the reciprocation axis 974 and below the handle 924 as viewed in FIG. 14, and the handle 924 is located below the reciprocation axis 974 as viewed in FIG. 14.

Various features of the disclosure are set forth in the following claims.

What is claimed is:

1. A power tool adapted to impart axial impacts to a tool bit, the power tool comprising:

a housing;

an electric motor supported in the housing;

a barrel supported by the housing;

a reciprocation drive assembly coupled to the electric motor and configured to convert torque from the electric motor to reciprocating motion of a piston that is at least partially received within the barrel for reciprocation therein along a reciprocation axis;

a striker received within the barrel for reciprocation in response to the reciprocation of the piston;

an anvil at least partially received within the barrel and positioned between the striker and the tool bit, the anvil configured to communicate axial impacts to the tool bit in response to the reciprocation of the striker; and a retainer received within the barrel and configured to selectively secure the striker in an idle position in which it is inhibited from reciprocating within the barrel, the retainer including an inner circumferential wall that defines a central bore extending therethrough along the reciprocation axis;

wherein the central bore at least partially receives a shank of the tool bit;

wherein the anvil is elongated and includes an open end and a closed end, and wherein the anvil defines an opening at the open end and an inner bore that communicates with the opening, and wherein the inner bore at least partially receives the shank of the tool bit;

wherein the power tool further includes a tool holder supported adjacent the barrel and configured to support the tool bit;

wherein the tool holder includes a case that partially encloses the barrel at a forward end thereof;

wherein the case includes a circumferentially-extending, inwardly-protruding first rib that defines an anvil aperture;

wherein the anvil aperture receives a portion of the anvil therethrough by sliding fit such that the case and the anvil cooperate to close the barrel at the forward end; and wherein the anvil includes a circumferentially-extending, outwardly protruding second rib that abuts the first rib of the case to define a forward movable extent of the anvil.

2. The power tool of claim 1, wherein the closed end of the anvil includes a bottom wall, and wherein the inner bore extends from the opening to the bottom wall.

3. The power tool of claim 2, wherein the anvil includes a length measured between the open end and the closed end, and wherein the inner bore extends up to half of the length.

4. The power tool of claim 2, wherein the anvil includes a length measured between the open end and the closed end, and wherein the inner bore extends at least half of the length.

5. The power tool of claim 1, wherein the reciprocation drive assembly is configured as a slider crank mechanism.

6. The power tool of claim 1, wherein the tool holder further includes a quick-connect mechanism having a sleeve movable between a release position at which the tool bit is removable from the tool holder, and a locking position at which the tool bit is non-removably secured by the tool holder.

7. The power tool of claim 6, wherein the tool holder further includes a case that partially encloses the barrel at a forward end thereof, the case including a tubular wall that defines a receptacle for receiving the tool bit, and wherein the sleeve is slidingly positioned about the tubular wall.

8. The power tool of claim 7, wherein the tool holder further includes a detent member that is urged radially inward by the sleeve in response to the sleeve being located in the locking position.

9. The power tool of claim 7, wherein the tool holder further includes a biasing member that biases the sleeve toward the locking position.

* * * * *